United States Patent
Buhler et al.

(10) Patent No.: US 12,229,617 B2
(45) Date of Patent: Feb. 18, 2025

(54) TEXTILE RFID TRANSPONDER AND METHOD FOR APPLYING A TEXTILE RFID TRANSPONDER TO TEXTILES

(71) Applicant: TEXTRACE AG, Frick (CH)

(72) Inventors: Stephan Buhler, Buchs (CH); Dirk Boltersdorf, Kreuzau (DE)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 18/021,900

(22) PCT Filed: Jul. 26, 2021

(86) PCT No.: PCT/EP2021/070770
§ 371 (c)(1),
(2) Date: Feb. 17, 2023

(87) PCT Pub. No.: WO2022/037900
PCT Pub. Date: Feb. 24, 2022

(65) Prior Publication Data
US 2024/0013023 A1 Jan. 11, 2024

(30) Foreign Application Priority Data
Aug. 17, 2020 (EP) ..................................... 20191292

(51) Int. Cl.
*G06K 19/07* (2006.01)
*G06K 19/077* (2006.01)

(52) U.S. Cl.
CPC .............................. *G06K 19/07762* (2013.01)

(58) Field of Classification Search
CPC ................................................ G06K 19/07762
(Continued)

(56) References Cited

U.S. PATENT DOCUMENTS

| 8,973,838 B2 | 3/2015 | Stobbe et al. |
| 10,406,404 B2 | 9/2019 | Bichler et al. |

(Continued)

FOREIGN PATENT DOCUMENTS

| DE | 10155935 | 5/2003 |
| DE | 102006011596 | 9/2007 |

(Continued)

OTHER PUBLICATIONS

English language translation of WO2009000446, of record in the applicant's information disclosure statement.*

(Continued)

*Primary Examiner* — Daniel A Hess

(57) ABSTRACT

A textile RFID transponder (20) has a textile carrier substrate (19) with a flat thread structure (16). At least one electrically conductive antenna thread (17) is introduced into the flat thread structure (16) of the textile carrier substrate (19). An RFID chip module (15) with a chip-bound module antenna (11) is applied to a first side of the textile carrier substrate (19) so that the module antenna (11) is coupled inductively into a transponder antenna (18) formed by the at least one conductive antenna thread (17). At least one hot-melt adhesive yarn (12; 16a; 16b; 16c) is introduced into the flat thread structure (16) of the textile carrier substrate (19).

20 Claims, 1 Drawing Sheet

(58) Field of Classification Search
USPC .......................................................... 235/492
See application file for complete search history.

(56) References Cited

U.S. PATENT DOCUMENTS

| | | |
|---|---|---|
| 2004/0244865 A1 | 12/2004 | Jung et al. |
| 2008/0074272 A1 | 3/2008 | Stobbe et al. |
| 2008/0252460 A1 | 10/2008 | Stobbe |
| 2009/0146790 A1 | 6/2009 | Speich |
| 2010/0051699 A1 | 3/2010 | Speich |
| 2014/0291409 A1 | 10/2014 | Nitta |
| 2016/0095377 A1 | 4/2016 | Tamm |
| 2020/0117973 A1 | 4/2020 | Schumacher et al. |

FOREIGN PATENT DOCUMENTS

| | | |
|---|---|---|
| DE | 102007016584 | 1/2008 |
| DE | 102008036101 | 2/2010 |
| DE | 102010017684 | 1/2012 |
| DE | 102014220087 | 4/2016 |
| DE | 102015208524 | 8/2016 |
| EP | 1983468 | 10/2008 |
| EP | 3640850 | 4/2020 |
| JP | 2002-298110 | 10/2002 |
| JP | 2009-545037 | 12/2009 |
| JP | 2010-261145 | 11/2010 |
| JP | 2013-092972 | 5/2013 |
| WO | 2008/011732 | 1/2008 |
| WO | 2008/034269 | 3/2008 |
| WO | 2009/000446 | 12/2008 |
| WO | 2009/036155 | 3/2009 |
| WO | 2010/116935 | 10/2010 |
| WO | 2011/160606 | 12/2011 |
| WO | 2019/151475 | 8/2019 |

OTHER PUBLICATIONS

English language translation of DE102007016584, of record in the applicant's information disclosure statement.*
Machine translation of DE102007016584A1, dated Jan. 3, 2008.*
International Search Report and Written Opinion dated Oct. 26, 2021 issued in corresponding IA No. PCT/EP2021/070770 filed Jul. 26, 2021.
International Preliminary Report on Patentability dated Feb. 16, 2023 issued in corresponding IA No. PCT/EP2021/070770 filed Jul. 26, 2021.

* cited by examiner

TEXTILE RFID TRANSPONDER AND METHOD FOR APPLYING A TEXTILE RFID TRANSPONDER TO TEXTILES

CROSS-REFERENCE TO RELATED APPLICATIONS

The present application is a 371 of International Application No. PCT/EP2021/070770, which was published in English on Feb. 24, 2022, which claims priority to EP Patent Application No. 20191292.0 filed on Aug. 17, 2020, both of which are incorporated herein by reference in their entireties.

TECHNICAL FIELD OF THE INVENTION

The invention relates to a textile RFID transponder, in particular an RFID transponder with a conductive antenna thread introduced into a textile carrier substrate. The invention also relates to a textile label with such a textile RFID transponder. The invention also relates to a method for applying textile RFID transponders with textile carrier substrates to textiles which are to be labelled.

TECHNICAL BACKGROUND

In the textile added value chain, it is customary to use labels with high-frequency and/or ultrahigh-frequency transponders, so-called "radio frequency identification tags" (RFID tags). On such RFID transponders, data relating to the production, identification, distribution, sale and marketing of the labelled product can be stored in a readable manner. RFID technology results in a wide range of possible applications in product lifecycle management (PLM), i.e. the individual tracking of the labelled textiles over their entire lifecycle or usage cycle, the prevention of theft or misuse, or also the follow-up of disposal and recycling.

RFID transponders are system components on the transmitter side which are used for contactless and automatic location and identification with the aid of high-frequency or ultrahigh-frequency radio waves. The RFID transponders are mobile transmitters which, through individually designating electronic identifiers or codes, can identify objects to which they are attached with respect to system receiver components. The transmitter and receiver are coupled via short-range alternating magnetic fields or high-frequency radio waves generated by the reader in order to be able to transmit data from the RFID transponder to the reader. A passive RFID transponder can also be supplied with energy via this electromagnetic coupling.

For very light and fine textile materials, such as outer clothing, it is desirable to develop RFID transponders which can be integrated into the textiles in a space-saving manner and with little disruption to the user of the textile materials, but still stable and resistant to washing processes and other mechanical loads.

The document US 2014/0291409 A1 discloses RFID tags for products made of flexible material, such as clothing and laundry products, which can be attached to the products made of flexible material. These RFID tags have a continuous RFID antenna body for forming an RFID label. The document EP 3 640 850 A1 discloses RFID systems with an RFID chip and an antenna for transmitting and/or receiving electromagnetic waves which are applied to a carrier material. The antenna consists of an electrically conductive thread, which forms a linear intersection-free structure. A segment of the electrically conductive thread wraps around the RFID chip without contact and is thereby coupled inductively into the RFID chip. The document WO 2009/036155 A1 discloses a woven fabric which contains a thermoplastic fusible yarn, and a method for producing a woven fabric article which contains a thermoplastic fusible yarn.

SUMMARY OF THE INVENTION

One of the objects of the invention is therefore based on finding solutions for optimising the integrability of RFID transponders in textile substrates, in particular for use in the textile industry added value chain.

These and other objects are achieved by an RFID transponder with the features of claim 1, by a textile label with the features of claim 11, by a method for producing an RFID transponder with the features of claim 12, and by a method for applying textile RFID transponders to textiles with the features of claim 19.

According to a first aspect of the invention, an RFID transponder comprises a textile carrier substrate with a flat thread structure. At least one conductive antenna thread is introduced into the flat thread structure of the textile carrier substrate. An RFID chip module with a chip-bound module antenna is applied to a first side of the textile carrier substrate so that the module antenna is coupled inductively into a transponder antenna formed by the at least one conductive antenna thread. At least one hot-melt adhesive yarn is introduced into the flat thread structure of the textile carrier substrate.

According to a second aspect of the invention, a textile label comprises an RFID transponder according to the first aspect of the invention.

According to a third aspect of the invention, a method for producing an RFID transponder, in particular an RFID transponder according to the first aspect of the invention, comprises the steps of creating a textile carrier substrate, in which at least one electrically conductive antenna thread and at least one hot-melt adhesive yarn are introduced into a flat thread structure, and applying an RFID chip module with a chip-bound module antenna to a first side of the textile carrier substrate so that the module antenna is coupled inductively into a transponder antenna formed by the at least one conductive antenna thread.

According to a fourth aspect of the invention, a method for applying textile RFID transponders according to the first aspect of the invention to textiles to be labelled comprises the steps of placing the textile RFID transponder on a textile material of a textile to be labelled, so that the RFID chip module lies between the textile carrier substrate and the textile material, and hot pressing the textile RFID transponder and the textile for a predetermined period of time, for example between 5 and 10 seconds, so that an adhesive of the at least one hot-melt adhesive yarn of the textile carrier substrate fuses adhesively with fibres of the textile. The temperature of the hot pressing process can be kept in a predetermined temperature range, for example between 110° C. and 140° C., for the predetermined period of time.

An essential idea of the invention consists in designing a textile RFID transponder in such a way that it becomes part of the material during hot pressing with a material to be labelled. This can be achieved in that flat thread structures are used as a carrier substrate for the electrical or electronic components and the flat thread structure can be integrally connected to the material to be labelled using hot-melt adhesive yarn during hot pressing. This offers the particular advantage that the textile RFID transponders become transparent and soft during hot pressing. As a result, they become almost invisible and can be applied to materials of any colour without impairing the appearance of the material. This is particularly advantageous for high-quality and/or lightweight items of clothing such as T-shirts, blouses or the like, since the integrated textile RFID transponder does not act as a disruptive foreign body, either visually or in terms of wearer comfort.

If the textile RFID transponders become an integral part of the material to be labelled, they can no longer be removed without destroying or damaging the labelled material due to the adhesion of the adhesives of the hot-melt adhesive yarns. This offers great advantages in terms of theft protection or the one-to-one traceability of the material along the textile added value chain through to recycling.

Furthermore, as an integral part of the labelled material, the textile RFID transponder can have a similar stretchability and elasticity to the labelled material, whereby the functionality of the labelled material is advantageously not or only minimally impaired. A textile label according to the second aspect of the invention can have at least one of the materials from the group comprising polyethylene terephthalate (PET), polyimide (PI), FR4 (composite material made of glass fibre fabric and epoxy resin) and polyetheretherketone (PEEK) as the module substrate for the RFID chip module. The RFID chip module can basically be designed as a multilayer laminate. This offers advantages when it comes to fulfilling requirements with regard to washing fastness, watertightness and/or chemical resistance to substances such as sweat or cleaning agents when used for the labelling of textiles.

According to some embodiments of the RFID transponders according to the invention, the flat thread structure can be designed as a woven or braided product. Alternatively, according to some further embodiments of the RFID transponders according to the invention, the flat thread structure can be designed as a knitted product, in particular as a warp knitted fabric. Knitted products are produced as knitted fabrics (also called "single-thread knitted fabrics") or knitted fabrics in which the threads are intertwined in loops (also known as "stitches"). As a rule, knitted products have a high elasticity and are looser than woven fabrics due to the local intermeshing. Due to their elasticity in both the longitudinal and transverse directions, their formability, their stretchability and their lightness, knitted products, in particular warp knitted fabrics, are suitable for use in textile RFID labels. Textile RFID labels based on knitted product substrates wrinkle less than woven fabrics and allow a good exchange of air and moisture. Single-thread knitted or crocheted fabrics are produced by crocheting or knitting processes in which each row of stitches has a single thread that forms loops that engage in the loops of the adjacent rows of stitches. In the case of knitted fabrics, a large number of knitting needles that can be operated synchronously are used, as is the case with, for example, the weft knitting technique, in which machine stitch formation takes place simultaneously over an entire row of knitting needles. In the warp knitting technique, parallel warp threads are connected to one another in the longitudinal direction via weft threads.

According to some further embodiments of the RFID transponder according to the invention, the flat thread structure can have at least one first hot-melt adhesive yarn which is knitted into the flat thread structure as a warp thread of the warp knitted fabric. According to some further embodiments, the flat thread structure can have a plurality of first hot-melt adhesive yarns, each with a carrier yarn, which are knitted into the flat thread structure in the region of the edges of the flat thread structure, in the region of the RFID chip module and/or in the region of the conductive antenna thread. Hot-melt adhesive yarns in which carrier yarns are coated with adhesives are, on the one hand, more stable and, on the other hand, have a larger amount of adhesives. As a result, such hot-melt adhesive yarns with carrier yarns are particularly suitable for the mechanically more heavily stressed parts of the RFID transponder, such as the edges, the region around the chip module and the region along the transponder antenna, in order to give the RFID transponder the necessary stability and adhesive force.

According to some further embodiments of the RFID transponder according to the invention, the flat thread structure can have at least one second hot-melt adhesive yarn without a carrier yarn. In this case, according to some further embodiments, the flat thread structure can have a plurality of second hot-melt adhesive yarns without a carrier yarn, which are knitted into the flat thread structure as long weft threads and/or partial weft threads. Hot-melt adhesive yarns without a carrier yarn have less adhesive than hot-melt adhesive yarns with a carrier yarn and are lighter. This allows the RFID transponder to be kept thin, flexible and light without impairing its mechanical stability too much. In some embodiments, in particular as a partial weft thread along the extension of the conductive antenna thread, hot-melt adhesive yarn without a carrier yarn can be knitted into the flat thread structure. This gives the antenna thread additional dimensional stability.

According to some further embodiments of the RFID transponder according to the invention, the chip-bound module antenna of the RFID chip module can be a loop antenna. According to some further embodiments of the RFID transponder according to the invention, the at least one conductive antenna thread can form an elongated or undulating transponder antenna as a dipole antenna. As an alternative to this, it may also be possible to design conductive antenna threads in the form of a patch antenna as a transponder antenna.

According to some further embodiments of the RFID transponder according to invention, the RFID chip module can be coated with a textile transfer adhesive and connected to the textile carrier substrate in a wash-proof manner via the textile transfer adhesive.

According to some embodiments of the method according to the third aspect of the invention, the production of the textile carrier substrate can comprise weaving or braiding. Alternatively, according to some other embodiments of the method according to the third aspect of the invention, the flat thread structure can be designed as a knitted product, in particular as a warp knitted fabric. The introduction of the at least one hot-melt adhesive yarn can comprise linking it into the flat thread structure. Knitted products are produced as knitted fabrics (also called "single-thread knitted fabrics") or knitted fabrics in which the threads are intertwined in loops (also known as "stitches"). As a rule, knitted products have a high elasticity and are looser than woven fabrics due to the local intermeshing. Due to their elasticity in both the longitudinal and transverse directions, their formability, their stretchability and their lightness, knitted products, in particular warp knitted fabrics, are suitable for use in textile RFID labels. Textile RFID labels based on knitted product substrates wrinkle less than woven fabrics and allow a good exchange of air and moisture. Single-thread knitted or crocheted fabrics are produced by crocheting or knitting processes in which each row of stitches has a single thread that forms loops that engage in the loops of the adjacent rows of stitches. In the case of knitted fabrics, a large number of knitting needles that can be operated synchronously are used, as is the case with, for example, the weft knitting technique, in which machine stitch formation takes place simultaneously over an entire row of knitting needles. In the warp knitting technique, parallel warp threads are connected to one another in the longitudinal direction via weft threads.

According to some embodiments of the method according to the third aspect of the invention, the hot-melt adhesive yarn can have a carrier yarn. In some embodiments, it may be possible for the hot-melt adhesive yarn to be knitted into the flat thread structure in the region of the edges of the flat thread structure, in the region of the RFID chip module and/or in the region of the at least one conductive antenna thread. This results in a local reinforcement of the mechanical stability in the respective regions due to the improved adhesion when the hot-melt adhesive yarns are melted.

According to some embodiments of the method according to the third aspect of the invention, the production of the textile carrier substrate can comprise knitting a plurality of hot-melt adhesive yarns without a carrier yarn as long weft threads and/or partial weft threads into the flat thread structure.

According to some embodiments of the method according to the third aspect of the invention, the knitting of a plurality of hot-melt adhesive yarns without a carrier yarn can comprise the knitting of a hot-melt adhesive yarn without a carrier yarn as a partial weft thread along the extension of the conductive antenna thread into the flat thread structure.

The above designs and developments can be combined with one another as desired, provided that such a combination is useful. Further possible configurations, developments and implementations of the invention also comprise combinations, not explicitly mentioned, of features of the invention described above or below with regard to the embodiments. In particular, a person skilled in the art will also add individual aspects as improvements or supplements to the particular basic form of the present invention.

BRIEF DETAILS OF THE FIGURES

The present invention will be described in greater detail below with reference to the embodiments shown in the schematic drawings. In the drawings.

Figure 1:
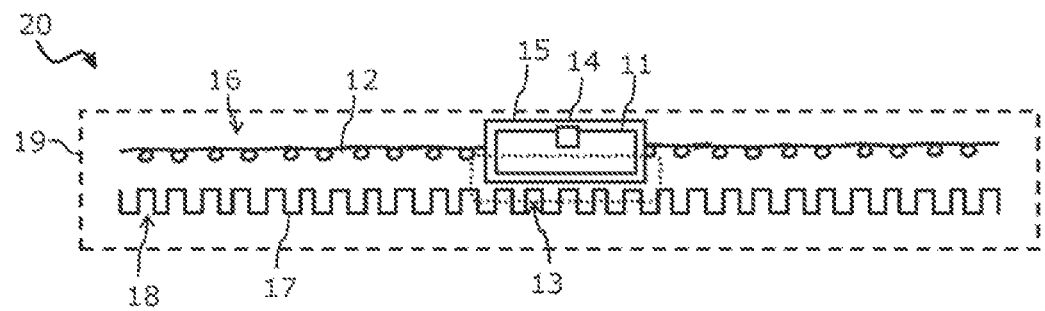
FIG. 1 shows a textile RFID transponder in a schematic plan view according to an embodiment of the invention.

The accompanying figures are intended to provide further understanding of the embodiments of the invention. They illustrate embodiments and, in conjunction with the description, serve to explain principles and concepts of the invention. Other embodiments and many of the advantages mentioned can be seen in the drawings. The elements of the drawings are not necessarily shown to scale with one another. Directional terminology such as "top", "bottom", "left", "right", "above", "below", "horizontal", "vertical", "front", "rear" and similar details are only used for explanatory purposes and not to restrict the generality to specific embodiments as shown in the figures.

In the figures of the drawings, identical, functionally identical and identically acting elements, features and components are each provided with the same reference signs, unless stated otherwise.

DETAILED DESCRIPTION OF EMBODIMENTS

RFID transponders in the context of the present invention are electronic modules which substantially have an electronic memory chip and an antenna that is coupled to the memory chip and integrated into the module. RFID transponders can transmit and receive electromagnetic signals in different frequency bands, for example in the range of 125 kHz ("low frequency", LF) and 5.8 GHz ("super-high frequency", SHF). The design of the integrated antenna is selected depending on the desired frequency band. Frequency bands around 13.56 MHz ("high frequency", HF) and between 860 MHz and 960 MHz ("ultra-high frequency", UHF) are of particular importance.

UHF frequency bands can be used in logistics, for example, since a greater range for access and readout can be achieved on these channels than on HF channels. The frequency, antenna shape and antenna size can be selected accordingly in order to ensure a desired range for access and readout, robustness against interference and environmental influences and robustness against RFID transponders interfering with one another. An air interface can be established via an electromagnetic field between a reader and the integrated antenna of the RFID transponder, via which data can be exchanged wirelessly and using specified data exchange protocols between the memory chip of the RFID transponder and a processor of the reader.

Hot-melt adhesive yarns in the context of the present invention comprise spinnable fibres which have a coarse fineness in the range between approximately dtex and 200 dtex and a melting range of approximately 80° C. to 140° C. Hot-melt adhesive yarns in the context of the present invention can contain polyamides or polyesters obtained by copolymerisation, such as, for example, copolymerised ternary mixtures of polyamide monomers or copolymerised ethylene vinylacetate mixtures. The copolymerisation of the hot-melt adhesive yarns can be effected, for example, with 11-aminoundecanoic acid, laurolactam, caprolactam, laurolactam or hexamethylenediamine, wherein these monomers are heated under a nitrogen atmosphere in order to obtain spinnable yarns of adjustable melting temperature. The melting temperature depends on the percentage volume proportion of the monomers used for the copolymerisation.

Hot-melt adhesive yarns in the context of the present invention can consist exclusively of polyamides or polyesters obtained by copolymerisation; however, it may also be possible to form only some of the hot-melt adhesive yarns using meltable yarn components and to form others using heat-resistant carrier yarns. These carrier yarns are often also called "cores". The proportion of the meltable yarn components can vary depending on the desired melting properties. The core can be formed, for example, by elastomeric polyester resins or polyurethane resins with a higher degree of fineness in the range between about 100 dtex and 800 dtex, which have a sufficiently high heat resistance in the melting range of the meltable yarn components as well as good resistance to surfactants and solvents commonly used in textile processing.

Hot-melt adhesive yarns in the context of the present invention can be processed in conventional textile processing processes, for example in processes for the production of woven or knitted products. Such hot-melt adhesive yarns can be introduced into a flat thread structure by loop-knitting, weaving, twisting, knitting, braiding or sewing. When a flat thread structure, into which hot-melt adhesive yarns are introduced, is briefly heated to around 10° C. to 20° C. above the melting point of the hot-melt adhesive thread, the polymer of the meltable yarn components begins to flow into the adjacent fibres and solidifies again after the flat thread structure has cooled down. During solidification, the heated polymer bonds the fibres into which it has flowed in a bonding or adhesion process. For example, it may be possible to use a thermosetting process in order to glue two different flat thread structures with hot-melt adhesive yarn components to one another.

FIG. 1 shows an RFID transponder 20 which can be used, for example, as a textile label. The RFID transponder 20 itself can represent the textile label or an RFID transponder can be fitted on a further label substrate to form the textile label 10.

The RFID transponder 20 comprises a textile carrier substrate 19, for example made of a woven or knitted textile material. For this purpose, the textile carrier substrate 19 can have a suitably designed flat thread structure 16, which can be formed, for example, using a weaving technique, a knitting technique, a braiding technique or a loop-knitting technique. The textile carrier substrate 19 can, for example, have a substantially rectangular outer contour and can be provided in order to be sewn or glued into an item of clothing.

Figure 2:
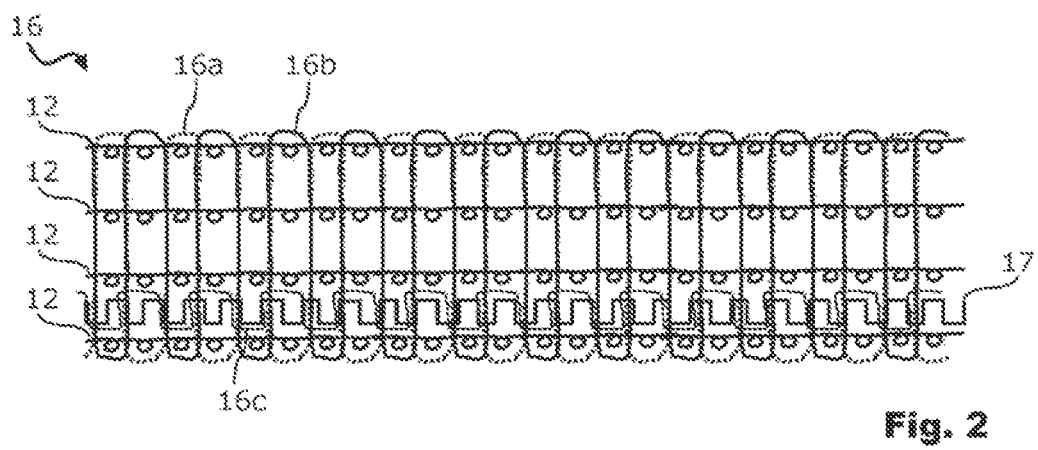
FIG. 2 shows schematically illustrated details of a carrier substrate of the textile RFID transponder according to FIG. 1 according to possible embodiments of the invention.

A dipole antenna, for example consisting of an electrically conductive antenna thread 17, is knitted or woven into the flat thread structure 16 of the textile carrier substrate 19 and, depending on the formation technique of the flat thread structure 16, can be introduced into the flat thread structure 16 as a weaving thread, weft thread or warp thread. The dipole antenna is used for signal transmission in the ultra-high frequency far field or in the high-frequency far field. For this purpose, the dipole antenna can have, for example, two elongated arms which either run linearly or have rectangular, wave-shaped or triangular undulations. In the example of FIGS. 1 and 2, rectangular undulations of the otherwise substantially elongated electrically conductive antenna thread 17 serving as a transponder antenna 18 are illustrated, without restricting the generality. The transponder antenna 18 can additionally have a loop antenna portion 17 open on one side in the region of the centre of the textile carrier substrate 19 along the longitudinal extension. It may also be possible to form undulating or meandering regions along the two elongated arms of the transponder antenna 18 only in some portions. When the dipole antenna arms are folded to form meanders, fractal structures or undulations, good compromises can be made with regard to the electrical properties and at the same time the dimensions of the dipole antenna can be limited in a space-saving manner.

An RFID chip module 15 is applied to the textile carrier substrate 19 on a first side (the top side in FIG. 1, i.e. the side facing the viewer). This RFID chip module 15 has a chip-bound module antenna 11, for example a loop antenna. The RFID chip module 15 is placed in relation to the transponder antenna 18 in such a way that the module antenna 11 can be coupled inductively into the transponder antenna 18 formed by the electrically conductive antenna thread 17. The RFID chip module can be placed, for example, in the centre or laterally offset with respect to a centre of the carrier substrate 19 and, if necessary, over a loop antenna portion of the transponder antenna 18. The region of the inductive coupling is indicated schematically in FIG. 1 by the reference sign 13.

The RFID chip module 15 can, for example, be coated on the underside with a textile transfer adhesive. This textile transfer adhesive provides the permanent adhesion of the RFID chip module 15 to the textile carrier substrate 19. In particular, the textile transfer adhesive can be selected in such a way that the RFID transponder 20, when used as a textile label or in a textile label, can be washed several times without the connection between the RFID chip module 15 and the textile carrier substrate 19 being broken.

The RFID chip module 20 can, for example, have a module substrate on which an RFID processor chip 14 and the module antenna 11 are arranged. The RFID processor chip 14 can have suitable electronic circuits such as, for example, a microprocessor, an FPGA or an ASIC, in order to carry out the data processing steps required by the RFID technology. The RFID chip module 20 further comprises a data memory (not shown) which can be integrated into the RFID processor chip 14, and optionally a temporary energy store for electrical energy for the temporary operation of the RFID processor chip 14, such as a capacitor.

The module substrate can be composed, for example, of one material or different materials. Examples of materials and material combinations are polyethylene terephthalate (PET), polyimide (PI), FR4 and polyetheretherketone (PEEK). The module substrate can also be provided with a multi-layer laminate of PET films, cross-linking adhesives and/or pressure-sensitive adhesives (PSA) in order to protect the module substrate and the circuit elements applied to it against laundry cycles or other conventional textile treatment steps and to maintain the functionality of the RFID transponder 20. The module antenna 11 can be formed, for example, from electrically conductive layers of, for example, aluminium or copper deposited on the module substrate, for example by stencil etching, PVD or CVD. Additive processes for applying conductive materials such as graphene or conductive inks are also possible.

As can be seen in FIG. 1, at least one hot-melt adhesive yarn is introduced into the flat thread structure 16 of the textile carrier substrate 19, designated by way of example in FIG. 1 by the reference sign 12. For example, a first hot-melt adhesive yarn can be knitted as a warp thread 12 into the flat thread structure 16 designed as a warp knitted fabric.

In FIG. 2, a plurality of first hot-melt adhesive yarns are shown by way of example, each of which is knitted into the flat thread structure 16 as a warp thread 12 of the warp knitted fabric. These first hot-melt adhesive yarns can each have a carrier yarn sheathed with hot-melt adhesive. Hot-melt adhesive yarns with a carrier yarn are usually more stable than hot-melt adhesive yarns without a carrier yarn and also have a higher amount of hot-melt adhesive per unit length. The first hot-melt adhesive yarns with carrier yarn can be used, for example, at points on the flat thread structure 16 where greater mechanical stability is required. In addition, the increased amount of hot-melt adhesive per unit length can increase the adhesion of the more heavily stressed regions to a textile material to be labelled. The regions in which a higher mechanical stability is desired can be, for example, edges of the flat thread structure 16, a region around the RFID chip module 15 and/or a region along the conductive antenna thread 17.

As also shown in FIG. 2, one or more second hot-melt adhesive yarns can be introduced into the flat thread structure 16. These second hot-melt adhesive yarns can be, for example, without a carrier yarn. The second hot-melt adhesive yarns without a carrier yarn can be knitted into the flat thread structure 16, for example, as first and second long weft threads 16a, 16b, i.e. as threads which hold the warp threads together in the transverse direction. In addition to the long weft threads 16a, 16b, hot-melt adhesive yarns can also be knitted into the flat thread structure 16 as partial weft threads 16c. Such partial weft threads 16c are particularly advantageous in the region along the extension of the conductive antenna thread 17 into the flat thread structure 16 in order to improve the local stability of the conductive antenna thread 17 and to prevent that the electrical transmission and reception properties of the transponder antenna 18 formed by the conductive antenna thread 17 undesirably worsen—by stretching, compression or creasing—for example in the case of a hot pressing process for applying the RFID transponder 20 to a material to be labelled.

Figure 3:
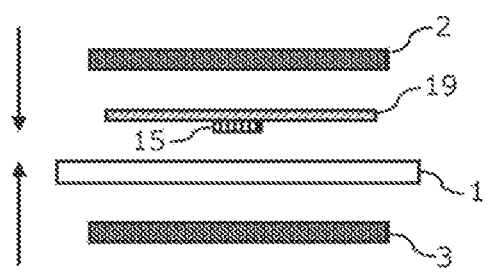
FIG. 3 is a schematic diagram of functional components of a hot press system for applying textile RFID transponders to textiles to be labelled according to a further embodiment of the invention.

FIG. 3 shows a schematic diagram of functional components of a hot press system for applying textile RFID transponders, such as the RFID transponder 20 explained in connection with FIGS. 1 and 2, to textiles to be labelled. For example, the hot press system can be used to apply an RFID transponder 20 to the material 1 of a textile 10 to be labelled, such as an item of outer clothing, as illustrated by way of example in FIG. 4.

The hot press system comprises two hot-pressing plates 2 and 3, between which the textile material 1 to be labelled is introduced as the lowest layer. Above this, the textile carrier substrate 19 of an RFID transponder 20 is inserted in such a way that the first side of the textile carrier substrate 19 points in the direction of the textile material 1 to be labelled, i.e. the RFID chip module 15 lies between the textile carrier substrate 19 and the textile material to be labelled 1. As a result, the more sensitive part of the RFID transponder 20, i.e. the RFID chip module 15, is encapsulated between the carrier substrate 19 and the textile material 1 to be labelled. This increases the wearer comfort of an item of outer clothing with such an RFID transponder 20 and protects the RFID chip module 15 against mechanical and chemical stresses during washing.

Figure 5:
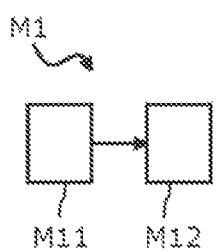
FIG. 5 shows an abstract flow diagram of an exemplary method for producing an RFID transponder according to a further embodiment of the invention.

FIG. 5 shows an abstract flow diagram of a method M1 for producing a textile RFID transponder. The method M1 can in particular be used to produce a textile RFID transponder, as has been explained in connection with FIGS. 1 and 2.

In a first step M11, a textile carrier substrate 19 is produced, in which at least one electrically conductive antenna thread 17 and at least one hot-melt adhesive yarn are introduced in a flat thread structure 16. This production can comprise, for example, weaving or braiding. Alternatively, the production according to the first step M11 can also comprise the knitting of the flat thread structure 16. When the flat thread structure 16 is knitted, the introduction of the at least one electrically conductive antenna thread 17 and the at least one hot-melt adhesive yarn can in each case comprise knitting into the flat thread structure 16, for example by linking. A plurality of different hot-melt adhesive yarns can be used: For example, hot-melt adhesive yarns with a carrier yarn can be used, and these are knitted into the flat thread structure 16 in the region of the edges of the flat thread structure 16, in the region of the RFID chip module 15 and/or in the region of the electrically conductive antenna thread 17. As an alternative or in addition to this, one or more hot-melt adhesive yarns without a carrier yarn can be used as long weft threads 16a; 16b and/or partial weft threads 16c are also knitted into the flat thread structure 16. In this case, hot-melt adhesive yarns without a carrier yarn are suitable, in particular, as partial weft threads 16c in the region along the extension of the electrically conductive antenna thread 17.

In a second step M12, an RFID chip module 15 with a chip-bound module antenna 11 is then applied to a first side of the textile carrier substrate 19 in such a way that the module antenna 11 is coupled inductively into a transponder antenna 18 formed by the at least one conductive antenna thread 17.

Figure 4:
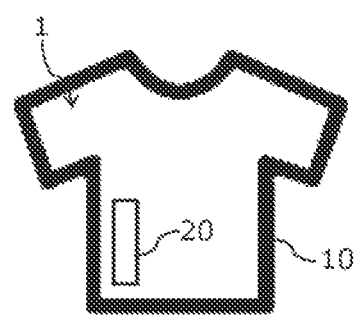
FIG. 4 is an illustration of an item of clothing made of textiles with an RFID transponder integrated therein according to a further embodiment of the invention.
Figure 6:
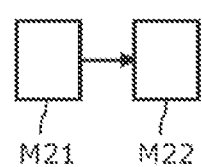
FIG. 6 shows an abstract flow diagram of an exemplary method for applying textile RFID transponders to textiles to be labelled according to a further embodiment of the invention.

An RFID transponder 20 produced in this way can be used in or as a textile label which can be used in the method M2 shown by way of example in FIG. 6 for applying a textile RFID transponder 20 to textiles to be labelled, such as an item of outer clothing 10 shown in FIG. 4. As a first step M21, the method M2 comprises laying the textile RFID transponder 20 onto a textile material 1 of a textile 10 to be labelled. The RFID transponder 20 is oriented in such a way that the RFID chip module 15 lies between the textile carrier substrate 19 and the textile fabric 1, i.e. with the first side of the carrier substrate 19 facing the textile material 1. In a second step M22, the textile RFID transponder 20 and the textile material 1 are then hot-pressed. The hot pressing is carried out at a predetermined temperature which is maintained for a predetermined period of time. In this case, an adhesive of the at least one hot-melt adhesive yarn of the textile carrier substrate 19 fuses adhesively with fibres of the textile material 1. The temperature can be between 110° C. and 140° C., for example. During the hot pressing process, this temperature can be maintained for between 5 and 10 seconds, for example, in order to ensure that the hot-melt adhesive of the hot-melt adhesive yarn used melts completely or at least largely, flows into the fibres of the textile material 1 and, when it cools, connects the RFID transponder 20 adhesively to the textile material.

In the preceding detailed description, various features have been summarised in one or more examples in order to improve the cogency of the representation. It should be clear, however, that the above description is merely illustrative and in no way restrictive in nature. It serves to cover all alternatives, modifications, and equivalents of the various features and embodiments. Many other examples will be immediately and directly apparent to a person skilled in the art on the basis of his technical knowledge in view of the above description.

The embodiments were selected and described in order to be able to present the principles on which the invention is based and their possible applications in practice as effectively as possible. This allows persons skilled in the art to optimally modify and use the invention and its various embodiments with regard to the intended use. In the claims and the description, the terms "including" and "having" are used as neutral terms for the corresponding term "comprising". Furthermore, the use of the terms "a" and "an" should not fundamentally exclude a plurality of features and components described in this way.

The invention claimed is:
1. A RFID transponder, comprising:
a textile carrier substrate with a flat thread structure formed as a knitted fabric;
at least one electrically conductive antenna thread which is introduced into the flat thread structure of the textile carrier substrate;

an RFID chip module with a chip-bound module antenna, which is applied to a first side of the textile carrier substrate so that the module antenna is coupled inductively into a transponder antenna formed by the at least one electrically conductive antenna thread, at least one hot-melt adhesive yarn is introduced into the flat thread structure of the textile carrier substrate, wherein the hot-melt adhesive yarn includes a spinnable fibre with a coarse fineness range between 10 decitex (dtex) and 200 decitex (dtex) and a melting range between 80° C. to 140° C., and wherein the flat thread structure has a plurality of second hot-melt adhesive yarns without a carrier yarn, which are knitted into the flat thread structure as long weft threads, as partial weft threads, or as a combination of long weft threads and partial weft threads.

2. The RFID transponder according to claim 1, wherein the flat thread structure is designed as a woven or braided product.

3. The RFID transponder according to claim 1, wherein the flat thread structure has at least one first hot-melt adhesive yarn which is knitted into the flat thread structure as a warp thread of the warp knitted fabric.

4. The RFID transponder according to claim 3, wherein the flat thread structure has a plurality of first hot-melt adhesive yarns, each with a carrier yarn, which are knitted into the flat thread structure in the region of the edges of the flat thread structure, in the region of the RFID chip module and/or in the region of the electrically conductive antenna thread.

5. The RFID transponder according to claim 1, wherein the flat thread structure has at least one second hot-melt adhesive yarn without a carrier yarn.

6. The RFID transponder according to claim 5, wherein the flat thread structure has a plurality of second hot-melt adhesive yarns without the carrier yarn, which are knitted into the flat thread structure as long weft threads and/or partial weft threads.

7. The RFID transponder according to claim 6, wherein the flat thread structure has a second, hot-melt adhesive yarn without the carrier yarn, which is knitted into the flat thread structure as a partial weft thread along the extension of the at least one electrically conductive antenna thread.

8. The RFID transponder according to claim 1, wherein the chip-bound module antenna of the RFID chip module is a loop antenna.

9. The RFID transponder according to claim 1, wherein the at least one electrically conductive antenna thread forms an elongated or undulating transponder antenna as a dipole antenna.

10. A textile label comprising an RFID transponder according to claim 1.

11. A method for producing an RFID transponder, in particular an RFID transponder according to claim 1, comprising:

producing a textile carrier substrate in which at least one electrically conductive antenna thread and at least one hot-melt adhesive yarn are introduced in a flat thread structure;

knitting the plurality of second hot-melt adhesive yarns without a carrier yarn into the flat thread structure; and applying an RFID chip module with a chip-bound module antenna to a first side of the textile carrier substrate, so that the module antenna is coupled inductively into a transponder antenna formed by the at least one electrically conductive antenna thread.

12. The method according to claim 11, wherein the production of the textile carrier substrate comprises weaving or braiding.

13. The method according to claim 11, wherein the production of the textile carrier substrate comprises knitting the flat thread structure and introducing the at least one electrically conductive antenna thread and the at least one hot-melt adhesive yarn into the flat thread structure.

14. The method according to claim 13, wherein the introduction of the at least one hot-melt adhesive yarn comprises linking into the flat thread structure.

15. The method according to claim 13, wherein the hot-melt adhesive yarn has a carrier yarn and is knitted into the flat thread structure in the region of the edges of the flat thread structure, in the region of the RFID chip module and/or in the region of the at least one electrically conductive antenna thread.

16. The method according to claim 13, wherein the production of the textile carrier substrate comprises knitting a plurality of hot-melt adhesive yarns without a carrier yarn as long weft threads and/or partial weft into the flat thread structure.

17. The method according to claim 16, wherein the knitting a plurality of hot-melt adhesive yarns without a carrier yarn comprises knitting a hot-melt adhesive yarn without the carrier yarn as a partial weft thread along the extension of the at least one electrically conductive antenna thread into the flat thread structure.

18. The method for applying a textile RFID transponder according to claim 1 to textiles to be labelled, comprising:

placing the textile RFID transponder on a textile material of a textile to be labelled so that the RFID chip module lies between the textile carrier substrate and the textile; and hot pressing the textile RFID transponder and the textile material for a predetermined period of time so that an adhesive of the at least one hot-melt adhesive yarn of the textile carrier substrate fuses adhesively with fibres of the textile material.

19. The method according to claim 18, wherein a temperature during the hot pressing is between 110° C. and 140° C. during the predetermined period of time.

20. The method according to claim 18, wherein the predetermined period of time is between 5 seconds and 10 seconds.

* * * * *